(12) United States Patent
Bleyer et al.

(10) Patent No.: US 12,413,859 B2
(45) Date of Patent: *Sep. 9, 2025

(54) SYSTEMS AND METHODS FOR GENERATING DEPTH INFORMATION FROM LOW-RESOLUTION IMAGES

(71) Applicant: Microsoft Technology Licensing, LLC, Redmond, WA (US)

(72) Inventors: Michael Bleyer, Seattle, WA (US); Christopher Douglas Edmonds, Carnation, WA (US); Antonios Matakos, Redmond, WA (US); Raymond Kirk Price, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,980

(22) Filed: Nov. 6, 2023

(65) Prior Publication Data
US 2024/0073523 A1  Feb. 29, 2024

Related U.S. Application Data

(63) Continuation of application No. 17/230,813, filed on Apr. 14, 2021, now Pat. No. 11,849,220.

(51) Int. Cl.
*H04N 23/68* (2023.01)
*G06T 3/4076* (2024.01)
*G06T 7/55* (2017.01)

(52) U.S. Cl.
CPC ......... *H04N 23/682* (2023.01); *G06T 3/4076* (2013.01); *G06T 7/55* (2017.01); *H04N 23/689* (2023.01)

(58) Field of Classification Search
CPC .. H04N 23/682; H04N 23/689; G06T 3/4076; G06T 7/55; G06T 2207/10016; G06T 7/579

See application file for complete search history.

(56) References Cited

U.S. PATENT DOCUMENTS 10,880,474 B1  12/2020  Thomas
2012/0147205 A1*  6/2012  Lelescu ................. H04N 23/62
                                                      348/E5.024

(Continued)

OTHER PUBLICATIONS

U.S. Appl. No. 17/230,813, filed Apr. 14, 2021.

(Continued)

*Primary Examiner* — Sinh Tran
*Assistant Examiner* — Zhenzhen Wu
(74) *Attorney, Agent, or Firm* — Workman Nydegger

(57) ABSTRACT

A system for generating depth information from low-resolution images is configured to access a plurality of image frames capturing an environment, identify a first group of image frames from the plurality of image frames, and generate a first image comprising a first composite image of the environment using the first group of image frames as input. The first composite image has an image resolution that is higher than an image resolution of the image frames of the first group of image frames. The system is also configured to obtain a second image of the environment, where parallax exists between a capture perspective associated with the first image and a capture perspective associated with the second image. The system is also configured to generate depth information for the environment based on the first image and the second image.

20 Claims, 15 Drawing Sheets

(56) References Cited

U.S. PATENT DOCUMENTS

| | | | |
|---|---|---|---|
| 2012/0176379 A1 | 7/2012 | Farrer | |
| 2014/0140579 A1 | 5/2014 | Takemoto | |
| 2014/0267243 A1 | 9/2014 | Venkataraman et al. | |
| 2015/0178988 A1* | 6/2015 | Montserrat Mora | G06T 17/20 345/420 |
| 2017/0359560 A1* | 12/2017 | Winn | H04N 23/743 |
| 2019/0166765 A1 | 6/2019 | Maor | |
| 2019/0364265 A1 | 11/2019 | Matsunobu | |
| 2020/0051265 A1* | 2/2020 | Kim | H04N 23/683 |
| 2020/0195910 A1* | 6/2020 | Han | H04N 13/25 |
| 2020/0267339 A1* | 8/2020 | Douady-Pleven | H04N 19/136 |
| 2021/0082086 A1* | 3/2021 | Bichu | G06T 5/80 |
| 2021/0092291 A1* | 3/2021 | Lee | H04N 25/48 |
| 2021/0243344 A1* | 8/2021 | Peng | H04N 23/71 |
| 2022/0270277 A1* | 8/2022 | Nielsen | H04N 23/698 |

OTHER PUBLICATIONS

U.S. Appl. No. 17/230,859, filed Apr. 14, 2021.
U.S. Appl. No. 18/482,654, filed Oct. 6, 2023.
Notice of Allowance mailed on Aug. 15, 2024, in U.S. Appl. No. 18/482,654 (MS# 409636-US02-DIV), 09 pages.

\* cited by examiner

SYSTEMS AND METHODS FOR GENERATING DEPTH INFORMATION FROM LOW-RESOLUTION IMAGES

CROSS-REFERENCE TO RELATED APPLICATIONS

This application is a continuation of U.S. patent application Ser. No. 17/230,813, filed on Apr. 14, 2021, and entitled "SYSTEMS AND METHODS FOR GENERATING DEPTH INFORMATION FROM LOW-RESOLUTION IMAGES", the entirety of which is incorporated herein by reference for all purposes.

BACKGROUND

Aerial images and/or videos often capture a physical environment from an overhead perspective. Aerial images and/or videos are typically captured by one or more image sensors positioned on an aerial vehicle (whether manned or unmanned). The acquisition of aerial images can serve many purposes, such as recreation, exploration, search and rescue, reconnaissance, and/or others.

However, many image sensors implemented on aerial vehicles are configured to capture low-resolution images (e.g., 640×480 resolution) and may further be configured to capture images at a low framerate (e.g., 10-30 fps). Accordingly, in some instances, aerial images and/or videos are undesirable, particularly for applications that benefit from high image resolution for computer vision applications.

For instance, high-resolution images may be used to generate depth information for a captured environment. Depth information may be represented in a depth map, disparity map, or other format for depicting distances between objects within the captured environment and the image sensor at an image capture time period (e.g., on a per-pixel basis). Depth information may be used to generate a 3D representation of a captured environment (e.g., in the form of a surface mesh, point cloud, or another format). A 3D representation of a captured environment may be used to facilitated mixed-reality (MR) experiences on MR systems, which may include augmented reality (AR) experiences on AR systems, virtual reality (VR) experiences on VR systems, etcetera. MR experiences that implement captured environments may be used for a variety of purposes, such as gaming, training, and/or others.

The quality of depth information and/or 3D representations generated based on captured images of an environment depend on the quality of the captured images of the environment. Thus, because aerial images and/or videos often include relatively low image resolution, generating depth information and/or 3D representations based on aerial images often provides poor results.

Thus, for at least the foregoing reasons, there is an ongoing need and desire for improved techniques for generating depth information from low-resolution images.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include systems, methods, and devices that facilitate the generation of depth information from low-resolution images.

Some embodiments provide a system that is configured to access a plurality of image frames capturing an environment, identify a first group of image frames from the plurality of image frames, and generate a first image comprising a first composite image of the environment using the first group of image frames as input. With the use of super-resolution imaging techniques, the first composite image has an image resolution that is higher than an image resolution of the image frames of the first group of image frames. The system is also configured to obtain a second image of the environment, where parallax exists between a capture perspective associated with the first image and a capture perspective associated with the second image. The system is also configured to generate depth information for the environment based on the first image and the second image.

Some embodiments include a system that is configured to capture a plurality of image frames of an environment, select a first group of image frames from the plurality of image frames, and generate a first composite image of the environment using the first group of image frames as input. The first composite image has an image resolution that is higher than an image resolution of the image frames of the first group of image frames. The system is also configured to (i) transmit the first composite image to a remote device while refraining from transmitting the first group of image frames to the remote device, or (ii) store the first composite image in a nonvolatile manner while refraining from storing the first group of image frames in a nonvolatile manner.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Disclosed embodiments include systems, methods, and devices that facilitate the generation of depth information from low-resolution images.

Examples of Technical Benefits, Improvements, and Practical Applications

Those skilled in the art will recognize, in view of the present disclosure, that at least some of the disclosed embodiments may be implemented to address various shortcomings associated with generating three-dimensional depth information from low-resolution images. The following section outlines some example improvements and/or practical applications provided by the disclosed embodiments. It will be appreciated, however, that the following are examples only and that the embodiments described herein are in no way limited to the example improvements discussed herein.

As described herein, groups of low-resolution image frames (whether captured by the same image sensor or not) may be combined to form high-resolution image frames. The high-resolution image frames may avoid artifacts (e.g., JPEG artifacts, motion blur artifacts, rolling shutter artifacts, etc.) and/or may include sufficient texture to be used to generate depth information for the captured environment represented in the low-resolution image frames. The low-resolution image frames may be captured by one or more image sensors attached to one or more vehicles (e.g., aerial vehicles) to advantageously facilitate rapid imaging and/or mapping of a real-world environment. In some instances, swarms of vehicles (e.g., swarms of drones) are used to further increase the rate at which a real-world environment can be captured and/or mapped for various applications.

Furthermore, in some instances, the amount of data stored and/or transmitted by an image capture device may be reduced by generating high-resolution images from low-resolution images and storing or transmitting the high-resolution images while refraining from storing or transmitting the low-resolution images. Such functionality may increase the amount of data that can be stored by an image capture device and/or reduce the amount of time between the capturing of an environment and the consumption of the captured data by users and/or devices.

Still furthermore, at least some principles described herein may be implemented as post-processing techniques and may operate on low-resolution images any time after they have been captured, which may allow existing low-resolution images to be used for additional applications/purposes.

Having just described some of the various high-level features and benefits of the disclosed embodiments, attention will now be directed to FIGS. 1 through 11. These Figures illustrate various conceptual representations, architectures, methods, and supporting illustrations related to the disclosed embodiments.

Example Systems

Figure 1:
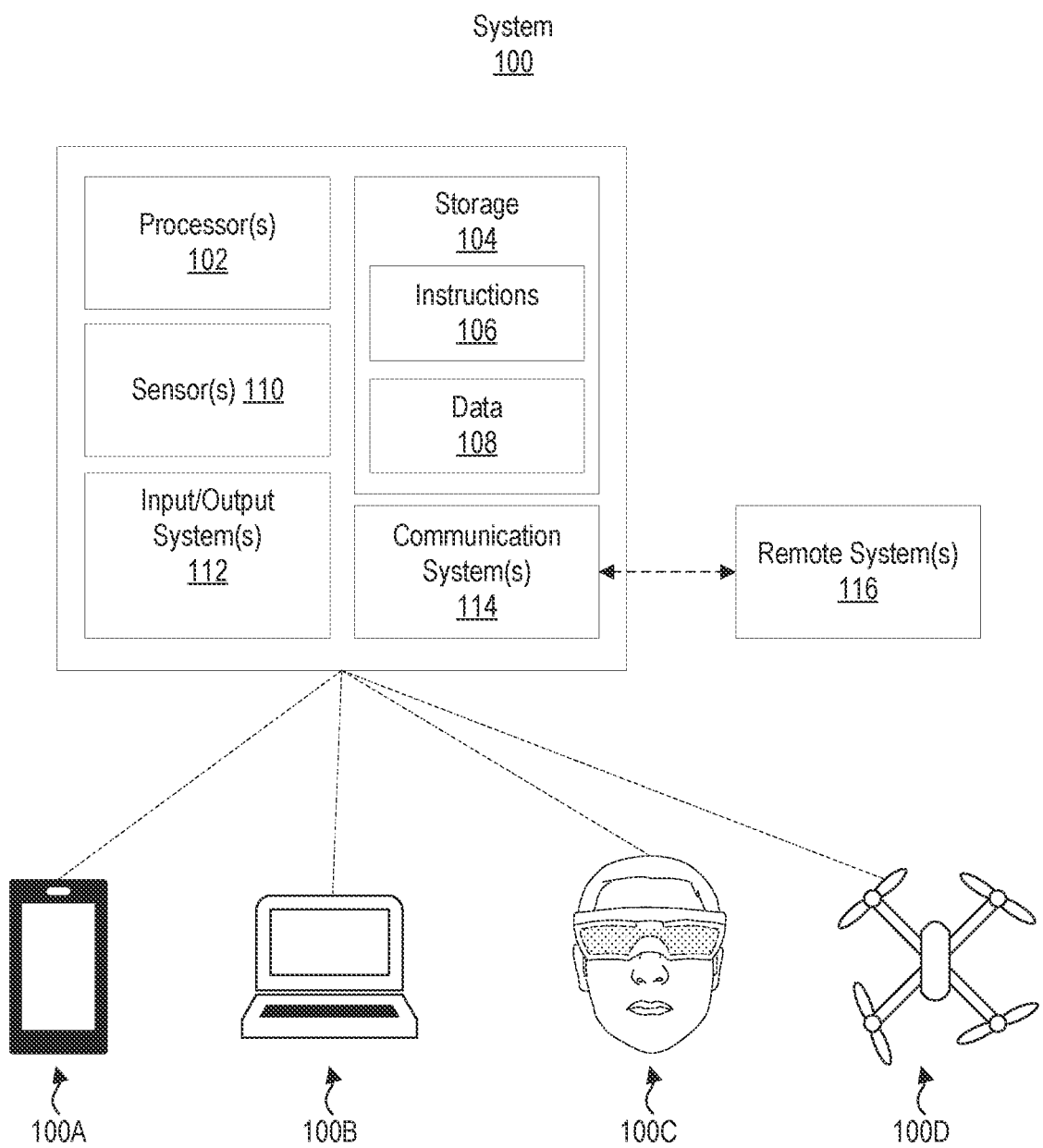
FIG. 1 illustrates example components of an example system that may include or be used to implement one or more disclosed embodiments.

FIG. 1 illustrates various example components of a system 100 that may be used to implement one or more disclosed embodiments. For example, FIG. 1 illustrates that a system 100 may include processor(s) 102, storage 104, sensor(s) 110, input/output system(s) 112 (I/O system(s) 112), and communication system(s) 114. Although FIG. 1 illustrates a system 100 as including particular components, one will appreciate, in view of the present disclosure, that a system 100 may comprise any number of additional or alternative components.

The processor(s) 102 may comprise one or more sets of electronic circuitry that include any number of logic units, registers, and/or control units to facilitate the execution of computer-readable instructions (e.g., instructions that form a computer program). Such computer-readable instructions may be stored within storage 104. The storage 104 may comprise physical system memory and may be volatile, non-volatile, or some combination thereof. Furthermore, storage 104 may comprise local storage, remote storage (e.g., accessible via communication system(s) 114 or otherwise), or some combination thereof. Additional details related to processors (e.g., processor(s) 102) and computer storage media (e.g., storage 104) will be provided hereinafter.

In some implementations, the processor(s) 102 may comprise or be configurable to execute any combination of software and/or hardware components that are operable to facilitate processing using machine learning models or other artificial intelligence-based structures/architectures. For example, processor(s) 102 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

The processor(s) 102 may be configured to execute instructions 106 stored within storage 104 to perform certain actions associated with the disclosed. The actions may rely at least in part on data 108 stored on storage 104 in a volatile or non-volatile manner.

In some instances, the actions may rely at least in part on communication system(s) 114 for receiving data and/or instructions from remote system(s) 116, which may include, for example, separate systems or computing devices, storage nodes, sensors, and/or others. The communications system(s) 116 may comprise any combination of software or hardware components that are operable to facilitate communication between on-system components/devices and/or with off-system components/devices. For example, the communications system(s) 116 may comprise ports, buses, or other physical connection apparatuses for communicating with other devices/components. Additionally, or alternatively, the communications system(s) 116 may comprise systems/components operable to communicate wirelessly with external systems and/or devices through any suitable communication channel(s), such as, by way of non-limiting example, Bluetooth, ultra-wideband, Wi-Fi, WLAN, infrared communication, and/or others.

FIG. 1 illustrates that a system 100 may comprise or be in communication with sensor(s) 110. Sensor(s) 110 may comprise any device for capturing or measuring data representative of perceivable phenomenon. By way of non-limiting example, the sensor(s) 110 may comprise one or more image sensors, optical scanners, microphones, thermometers, barometers, magnetometers, accelerometers, gyroscopes, and/or others.

Furthermore, FIG. 1 illustrates that a system 100 may comprise or be in communication with I/O system(s) 112. I/O system(s) 112 may include any type of input or output device such as, by way of non-limiting example, a display, a touch screen, a mouse, a keyboard, a controller, a speaker, a light source, a vibration motor, and/or others, without limitation. In some instances, I/O system(s) 112 may at least partially rely on the sensor(s) 110 (e.g., via a microphone or motion sensor system to detect user input).

FIG. 1 conceptually represents that the components of the system 100 may comprise or utilize various types of devices, such as mobile electronic device 100A (e.g., a smartphone), personal computing device 100E3 (e.g., a laptop), a mixed-reality head-mounted display 100C (HMD 100C), an aerial vehicle 100D (e.g., a drone), and/or other devices (e.g., non-aerial vehicles, such as cars, boats, submarines, etc.). Although the present description focuses, in at least some respects, on utilizing one or more aerial vehicles 100D to implement techniques of the present disclosure, additional or alternative types of systems may be used.

Example Techniques for Generating Depth Information from Low-Resolution Images

Figure 2A:
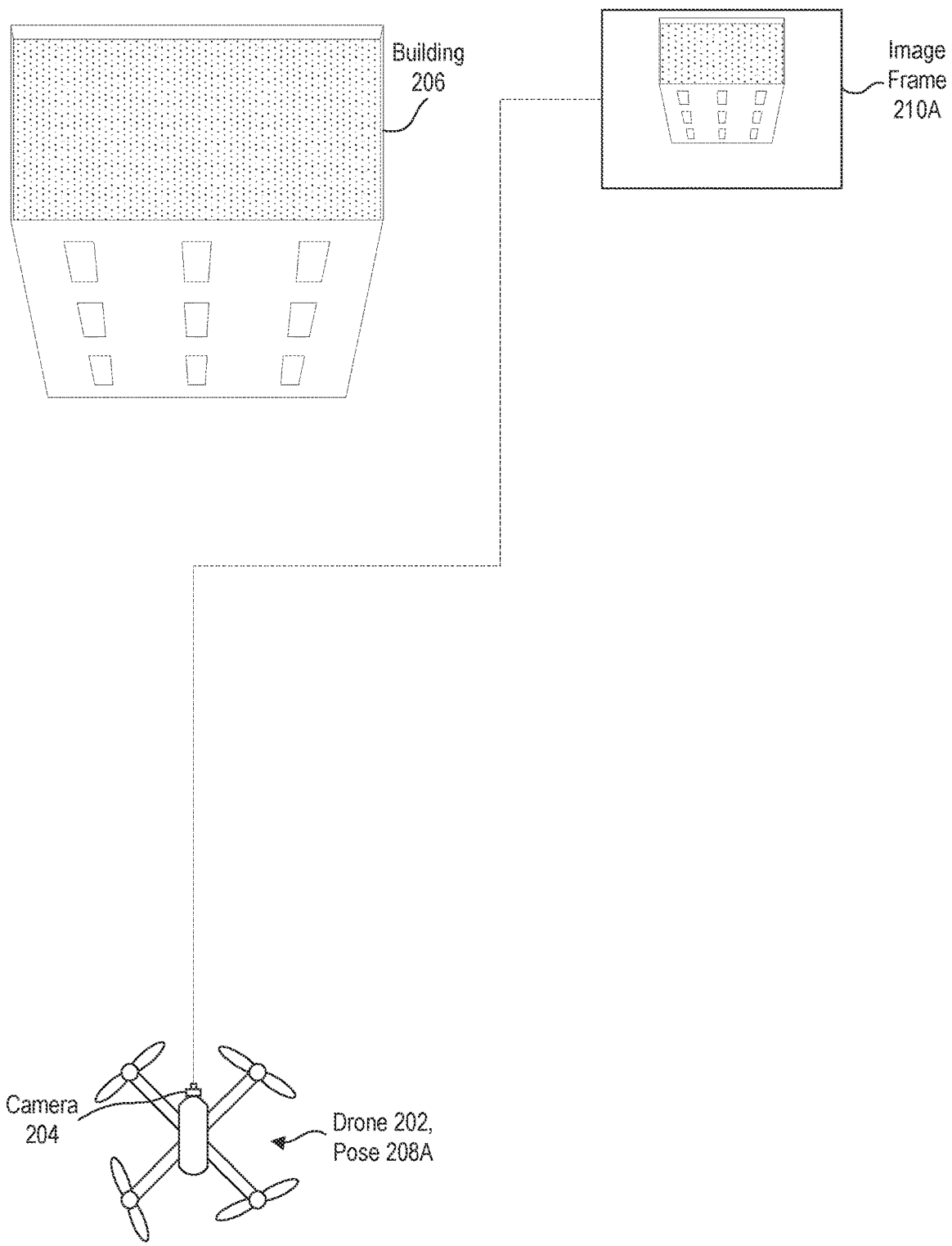
FIGS. 2A-2C illustrate an example of capturing low-resolution images using an image sensor attached to an aerial vehicle.
Figure 2B:
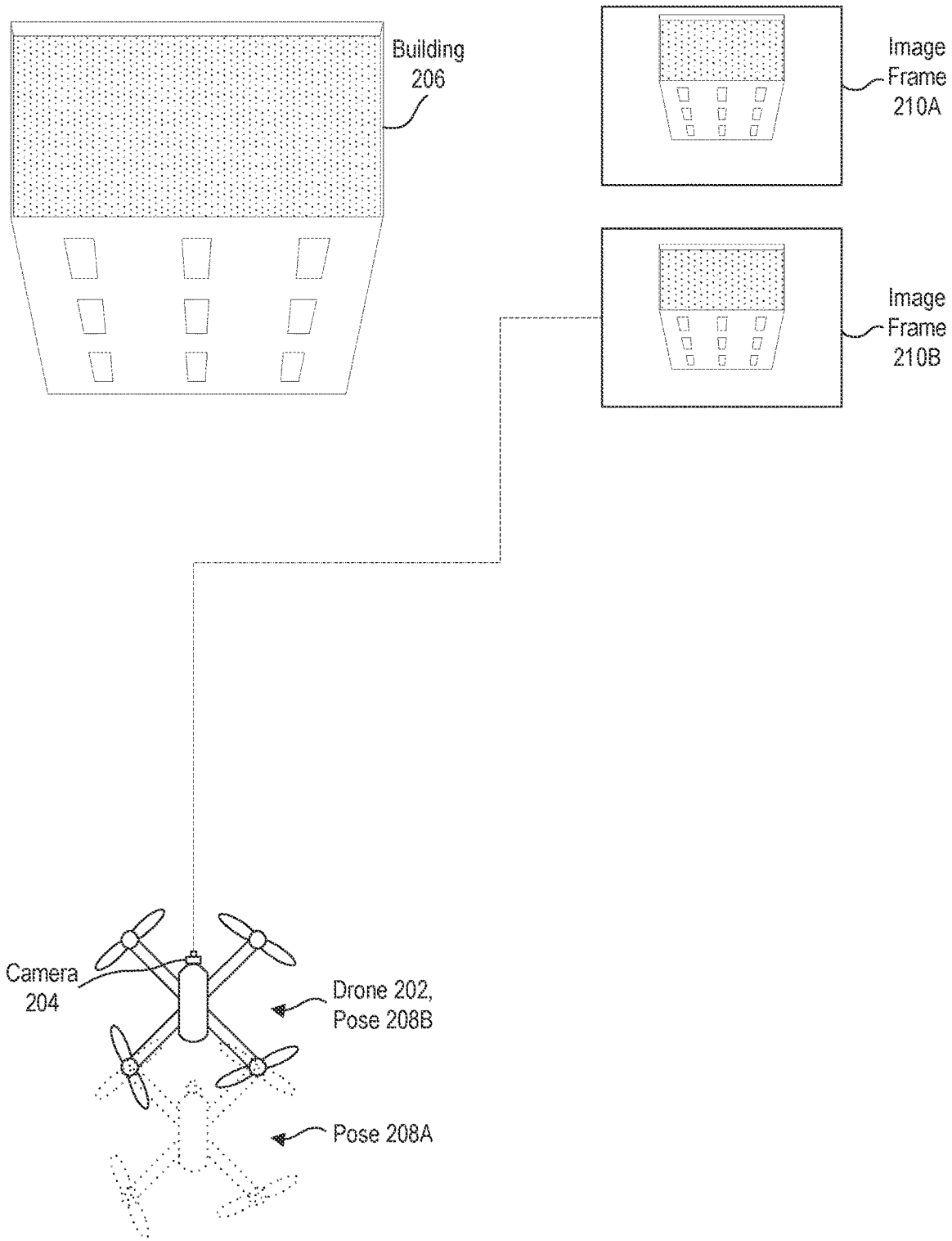
Figure 2C:
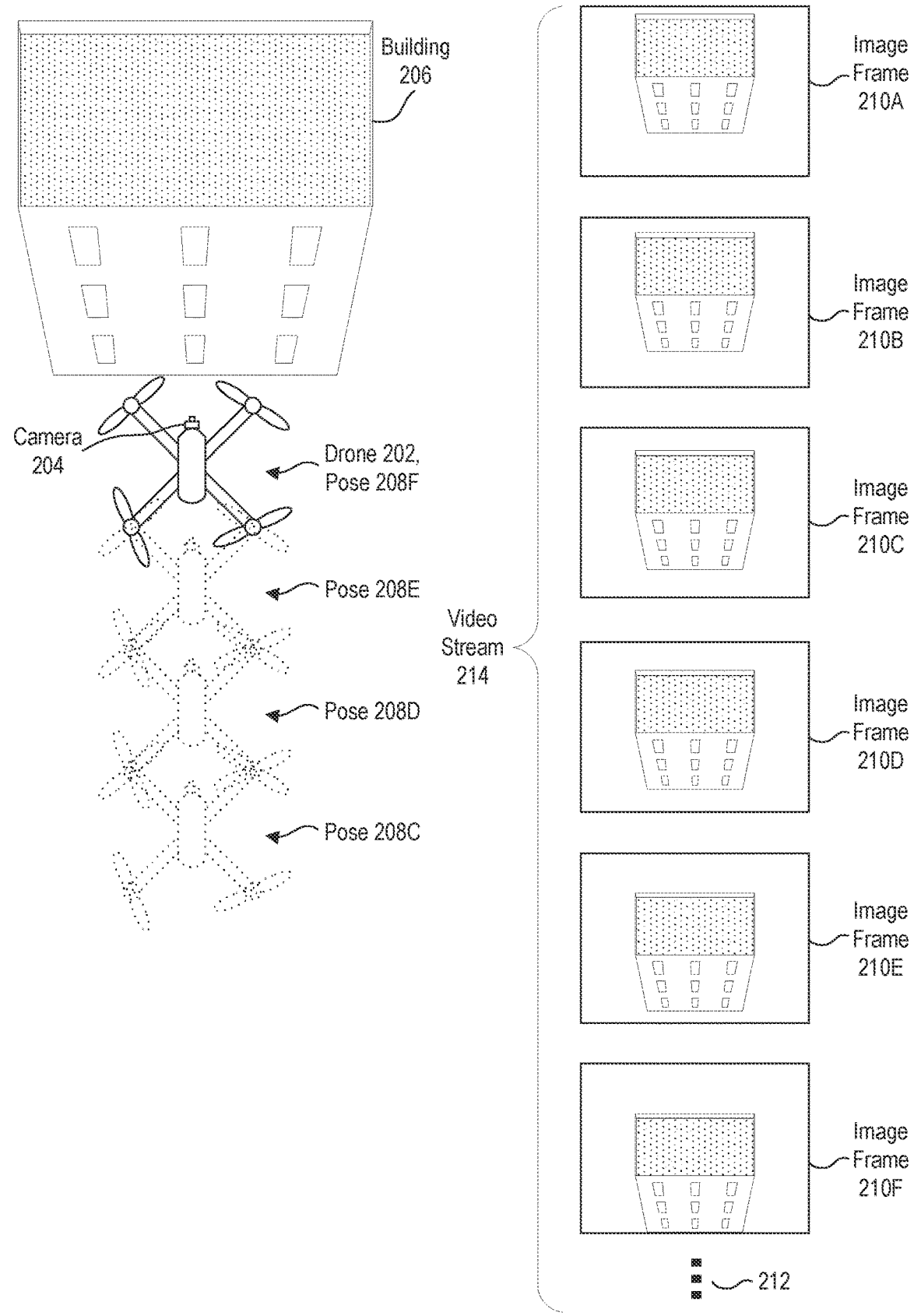

FIGS. 2A-2C illustrate an example of capturing low-resolution images using an image sensor attached to an aerial vehicle. In particular, FIG. 2A illustrates a conceptual representation of a drone 202 traveling within an environment that includes a building 206. The drone 202 is positioned at pose 208A within the environment. The pose 208A may be determined by sensor(s) 110 discussed above, which may include one or more inertial measurement units (IMUS), radio-based positioning systems (e.g., GPS), and/or other systems for determining position of the drone 202 within the environment.

FIG. 2A also illustrates that the drone 202 includes a camera 204 affixed thereon. As depicted in FIG. 2A, while the drone 202 is positioned according to pose 208A, the camera 204 captures an image frame 210A of the building 206 within the environment. Although the present example focuses, in at least some respects, on image capture facilitated by a camera positioned on a drone traveling within an environment, those skilled in the art will recognize, in view of the present disclosure, that the principles described herein may be applied to other image capture devices and/or techniques (e.g., image capture by cameras positioned on other types of aerial vehicles, cars, vessels, etc.).

FIG. 2B illustrates the drone 202 positioned at a new pose 208B within the environment relative to the building 206 (the previous pose 208A of the drone 202 from FIG. 2A is depicted in dotted lines in FIG. 2B for reference). For example, after capturing image frame 210A at pose 208A, the drone 202 may continue to travel within the environment and capture another image frame 210B of the building 206 from pose 208B. Similarly, FIG. 2C shows additional image frames 210C, 210D, 210E, and 210F captured by the camera 204 of the drone 202 at corresponding respective poses 208C, 208D, 208E, and 208F. As illustrated in FIGS. 2A-2C, the image frames 210A-210F are captured by the camera 204 at temporally consecutive timepoints and form a video stream 214 capturing the building 206 from similar aerial perspectives. The ellipsis 212 indicates that a video stream 214 capturing an environment may include any number of image frames.

As indicated above, the image frames 210A-210F captured by the camera 204 on the drone 202 may comprise a resolution that renders the image frames 210A-210F generally undesirable for various applications. The image frame 210A may include an image resolution below about 1024× 1024 pixels, or below 700×500 pixels (e.g., VGA resolution e.g., 640×480 pixels). With such a low image resolution, the image frames 210A-210F may be undesirable inputs for performing stereo matching to generate depth information describing the captured building 206.

Accordingly, techniques of the present disclosure are directed to using low-resolution image frames (e.g., image frames 210A-210F) to generate suitable inputs for performing stereo matching (or other depth processing) for determining depth information for a captured environment.

Figure 3A:
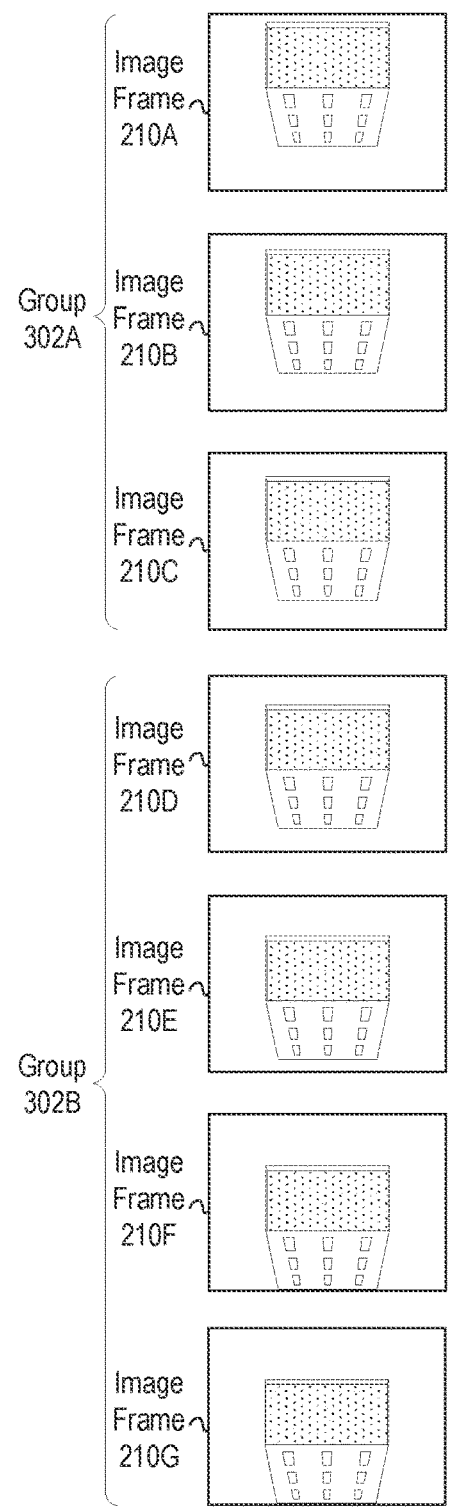
FIGS. 3A-3C illustrate an example of generating high-resolution depth information based on low-resolution images captured by an image sensor attached to an aerial vehicle.
Figure 3B:
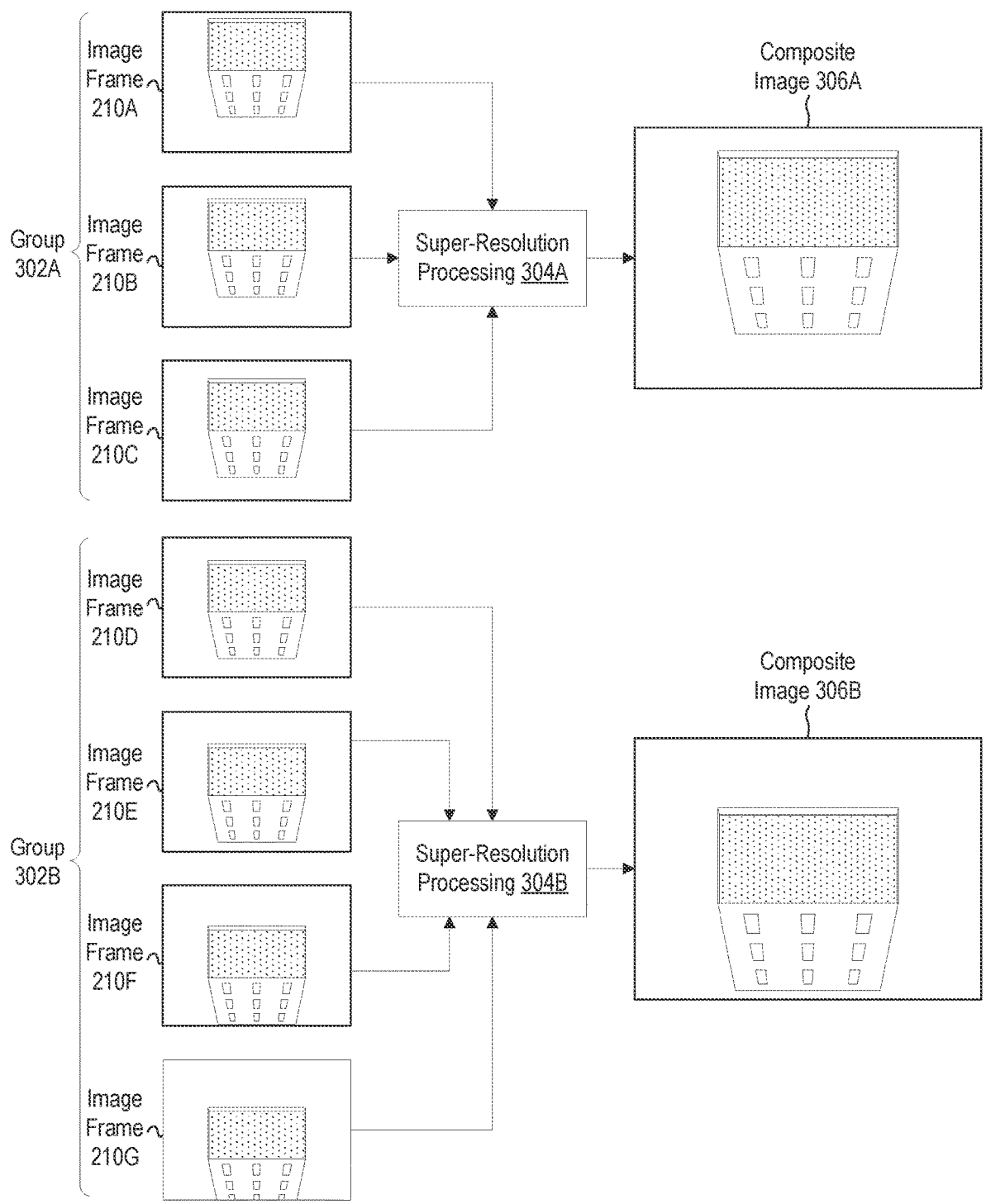
Figure 3C:
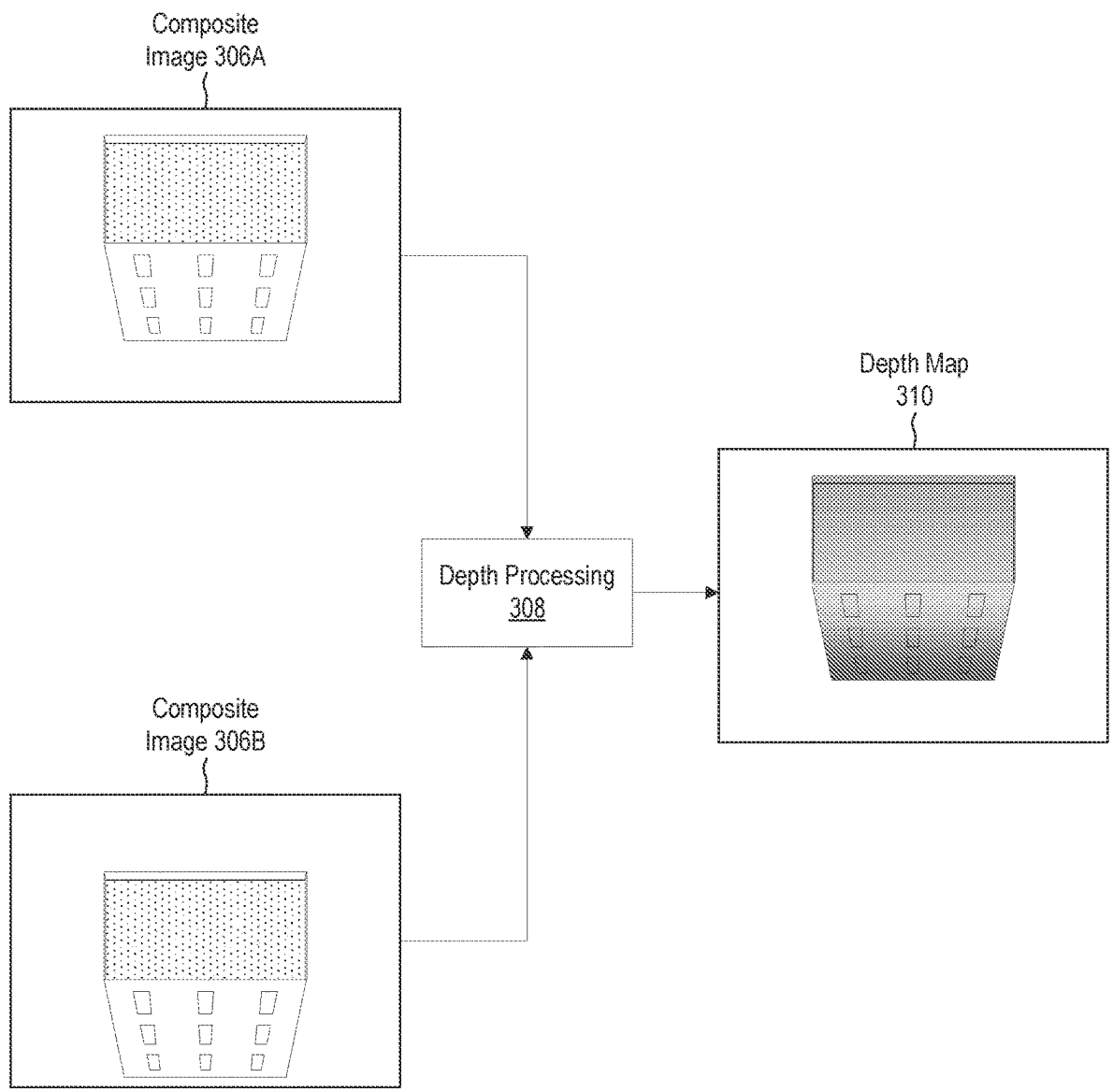

FIGS. 3A-3C illustrate an example of generating high-resolution depth information based on low-resolution images captured by an image sensor attached to an aerial vehicle. In particular, FIG. 3A illustrates the image frames 210A-210F of the video stream 214 described above, as well as an additional image frame 210G capturing the building 206 for illustrative purposes. The image frames 210A-210G may be accessed by computational resources associated with the drone 202 and/or another system/device to facilitate the processing described herein for generating depth information from low-resolution images.

To facilitate generation of depth information from low-resolution images, a system may define groups of image frames, and the groups of image frames may be used to generate composite image frames with a high enough image resolution for depth processing (e.g., stereo matching). FIG. 3A shows the image frames 210A-210G divided into groups 302A and 302B, where group 302A includes image frames 210A-210C and group 302B includes image frames 210D-210G. Groups of image frames may include any number of image frames in accordance with the present disclosure.

Image frames may be grouped using various approaches and/or grouping criteria. In some implementations, consecutively captured image frames are grouped together to form groups of one or more predetermined group sizes (e.g., groups of 10 consecutively captured image frames).

In some instances, groups are identified based on pose values associated with image frames. For instance, as shown and described with reference to FIGS. 2A-2C, image frames 210A-210F may be associated with respective poses 208A-208F that existed for the camera 204 and/or drone 202 during capture of the image frames 210A-210F. An image frame may thereby be grouped with other image frames based on proximity of its associated pose to poses associated with the other image frames. Proximity between poses may be determined based on various aspects, such as translational position (e.g., x-y-z position, longitude-latitude-altitude, angular orientation, etc.).

In one example, a system (e.g., including the drone 202 and the camera 204) may capture a first image frame at a first pose and may group subsequently captured image frames with the first image until the system captures a second image frame at a second pose that satisfies a threshold difference from the first pose. The system may then begin a new group that includes the second image frame and image frames captured subsequent to the second image frame at poses that do not satisfy a threshold difference from the second pose. Thus, the number of image frames in a group may be dynamic (e.g., depending on the rate of change in capture pose). Other techniques for grouping image frames may be utilized (e.g., post-processing grouping techniques).

Accordingly, a group of image frames may include image frames with only a small amount of parallax between capture perspectives associated with the image frames of the group. For example, image frames 210A-210C of FIG. 3A show the building 206 as being captured from similar capture perspectives (with the upper boundary of the building being near the top of the image frames 210A-210C), and image frames 210D-210G of FIG. 3A show the building 206 as being captured from similar capture perspectives (with the upper boundary of the building being lower relative to image frames 210A-210C). Providing groups of image frames captured with minimal parallax may improve the usability of the image frames for generating composite images (e.g., via super-resolution upsampling), as described hereinafter.

FIG. 3B illustrates an example of generating composite images 306A and 306B from the groups 302A and 302B of image frames. In particular, FIG. 3B shows image frames 210A, 210B, and 210C of group 302A being provided as input to super-resolution processing 304A to generate composite image 306A. Super-resolution processing 304A may include one or more upsampling algorithms configured to generate a single high-resolution image from multiple low-resolution images (e.g., an algorithm for creating high-resolution images from low-resolution video). For example, super-resolution processing 304A to generate a high-resolution image from one or more low-resolution images may employ techniques such as spatial domain approaches (e.g., sample transformation using the sampling theorem and the Nyquist theorem), frequency domain approaches (e.g., registering images using properties of the discrete Fourier transform), learning based techniques (e.g., adaptive regularization, pair matching, etc.), iterative reconstruction and interpolation based techniques (e.g., iterative back projection, pixel replication, nearest-neighbor interpolation, bilinear or bicubic interpolation, etc.), dynamic tree and wavelet based resolution techniques (e.g., mean field approaches), filtering techniques (e.g., edge-preserving filtering operations such as joint bilateral filter, guided filter, bilateral solver, etc.) and/or others.

In this regard, the composite image 306A comprises a higher image resolution than the image frames 210A-210C used to generate the composite image 306A. The composite image 306A may thus be regarded as a "high-resolution image."

Furthermore, in some instances, the super-resolution processing 304A is tailored to improve the amount of distinguishable texture (e.g., micro-texture) present in the composite image 306A as compared to the amount of distinguishable texture present in the image frames 210A-210C. Thus, in some instances, a composite image 306A provides a better candidate for depth processing (e.g., stereo matching) than the individual image frames 210A-210C.

FIG. 3B also illustrates image frames 210D, 210E, 210F, and 210G of group 302B being provided as input to super-resolution processing 304B to generate composite image 306B. super-resolution processing 304B may be similar to super-resolution processing 304A. Accordingly, composite image 306B comprises an image resolution that is higher than the image resolution of image frames 210D-210G, and composite image 306B may comprise sufficient texture for use in depth processing.

FIG. 3B illustrates that parallax exists between the viewing perspective associated with composite image 306A and the viewing perspective associated with composite image 306B. For example, the top portion of the depiction of the building 206 in composite image 306A is near the top of the frame of composite image 306A, whereas the top portion of the depiction of the building 206 in composite image 306B is lower as compared to composite image 306A. Many depth processing techniques (e.g., stereo matching) rely on the existence of sufficient (but not excessive) parallax between images capturing a common object in an environment. Thus, composite images 306A and 306B may comprise desirable inputs for depth processing to determine depth information. In contrast, consecutively captured low-resolution image frames (e.g., from the set of image frames including image frames 210A-210G) may not include sufficient resolution, texture, or parallax to comprise desirable inputs for generating depth information for a captured environment.

FIG. 3C illustrates the composite images 306A and 306B being provided as inputs to depth processing 308 to generate a depth map 310 (other representations of depth/distance are contemplated). Depth processing 308 may comprise stereo matching or other techniques for determining depth from image data input. The depth map 310 comprises per-pixel depth information representing distance between (i) the viewing position/perspective associated with the composite images 306A, 306B and (ii) the object(s) depicted in the composite images 306A and/or 306B.

Depth processing 308 to calculate depth information may be performed in various ways, including stereo matching. To perform stereo matching, a pair of images is obtained (e.g., composite images 306A and 306B). A rectification process is typically performed, whereby corresponding pixels in the different images of the pair of images that represent common 3D points in the environment become aligned along scanlines (e.g., horizontal scanlines, vertical scanlines, epipolar lines, etc.). For rectified images, the coordinates of the corresponding pixels in the different images only differ in one dimension (e.g., the dimension of the scanlines). A stereo matching algorithm may then search along the scanlines to identify pixels in the different images that correspond to one another (e.g., by performing pixel patch matching to identify pixels that represent common 3D points in the environment) and identify disparity values for the corresponding pixels. Disparity values may be based on the difference in pixel position between the corresponding pixels in the different images that describe the same portion of the environment. Per-pixel depth may be determined based on per-pixel disparity values, providing a depth map.

Thus, in accordance with the present disclosure, low-resolution image frames (e.g., captured by a drone 202 traveling within an environment) may be used to generate composite images, which may then be used to generate depth information. The depth information represented in the depth map 310 may be used for various applications, such as generating a surface mesh of a captured environment (e.g., for use in MR environments/experiences).

In the example discussed with reference to FIGS. 3A-3C, the image frames of group 302A (used to generate composite image 306A) and the image frames of group 302B (used to generate composite image 306B) were captured from the same image capture device (i.e., camera 204 associated with drone 202), and the image frames of group 302B were captured temporally subsequent to the image frames of group 302A. However, the principles described herein may be implemented under other circumstances.

Figure 4:
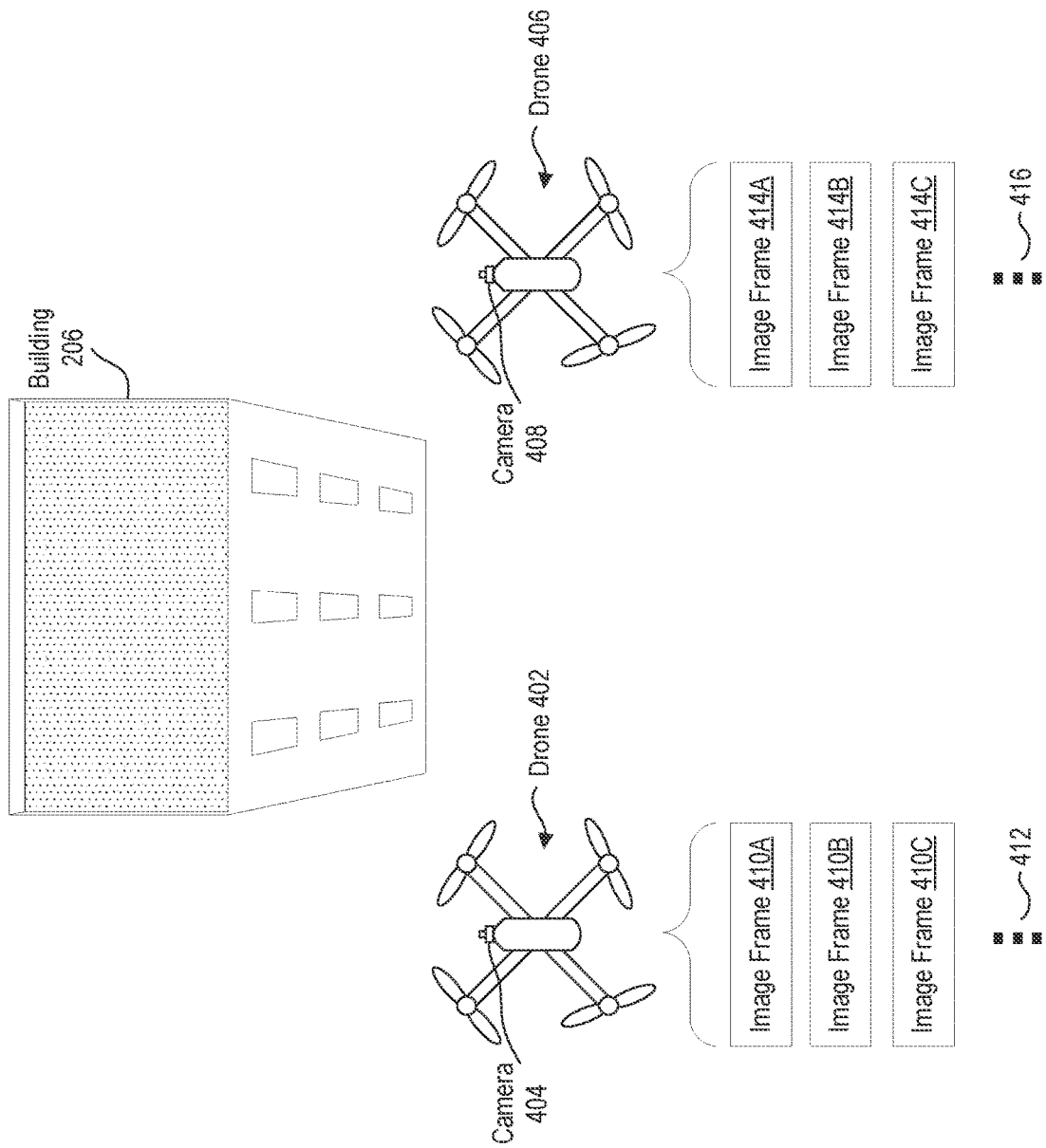
FIG. 4 illustrates an example of capturing low-resolution images using image sensors attached to different aerial vehicles.

For example, FIG. 4 illustrates drone 402 and drone 406 traveling within an environment that includes building 206. Drone 402 is physically untethered from drone 406. Drone 402 includes camera 404, and drone 406 includes camera 408. Both cameras 404 and 408 capture the building 206 as the drones 402 and 406 move within the environment. In particular, camera 404 captures image frames 410A, 410B, and 410C (and/or others, indicated by ellipsis 412) as drone 402 moves within the environment, and camera 408 captures image frames 414A, 414B, and 414C (and/or others, indicated by ellipsis 416) as drone 406 moves within the environment.

As noted above, the various image frames captured by the cameras 404, 408 may be associated with pose values that existed during image capture (e.g., corresponding to the position of the drones 402, 406 and/or the cameras 404, 408 during image capture). Furthermore, in some instances, the image capture timing of camera 404 may be temporally synchronized with the image capture timing of camera 408 (e.g., such that both cameras capture pairs of images corresponding timestamps). As before, the image frames 410A-410C and 414A-414C may be low-resolution images.

Figure 5:
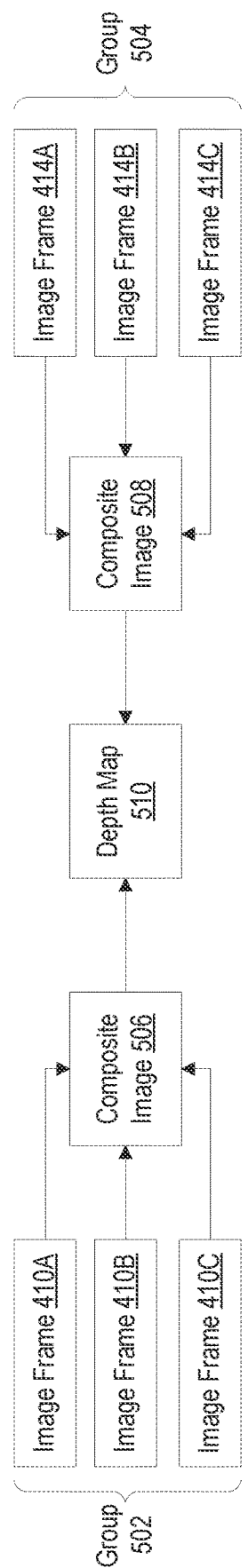
FIG. 5 illustrates an example of generating high-resolution depth information based on low-resolution images captured by image sensors attached to different aerial vehicles.

FIG. 5 illustrates that low-resolution image frames captured from different image capture devices may be used to generate depth information for a captured environment. In particular, FIG. 5 shows the image frames 410A-410C captured by camera 404 of drone 402 grouped into group 502, and FIG. 5 shows the image frames 414A-414C captured by camera 408 of drone 406 grouped into group 504. Thus, groups 502 and 504 include image frames captured by image sensors attached to different vehicles (e.g., drones 402 and 406, which are physically untethered from one another). Notwithstanding, the image frames of the groups 502 and 504 may be used to generate depth information for the captured environment.

FIG. 5 depicts composite image 506 generated using image frames 410A-410C of group 502. FIG. 5 also depicts composite image 508 generated using image frames 414A-414C of group 504. The composite images 506 and 508 may be generated using super-resolution processing, as discussed above with reference to FIG. 3B (e.g., similar to super-resolution processing 304A, 304B). Accordingly, the composite images 506 and 508 may comprise sufficient image resolution and texture to facilitate depth computations. Furthermore, in some implementations, the capture perspective associated with camera 404 while capturing image frames 410A-410C may have been sufficiently different from the capture perspective associated with camera 408 while capturing image frames 414A-414C such that sufficient parallax exists between the composite images 506 and 508 to facilitate depth computations. For example, drone 402 may be traveling within the environment and capturing the building 206 at a distance from drone 406 that causes parallax between images captured by the different drones at least partially exceeds the sub-pixel level.

FIG. 5 shows depth map 510 being generated using composite images 506 and 508 as inputs. Depth map 510 may be generated via depth processing such as stereo matching (e.g., similar to depth processing 308 discussed above with reference to FIG. 3C). In this regard, depth information may be generated from low-resolution images captured by image sensors associated with different vehicles (e.g., aerial vehicles, such as drones 402 and 406).

The foregoing examples have focused, at least in part, on implementations in which multiple composite images are used as inputs to generate depth information. In some implementations, a composite image (e.g., generated based on low-resolution image frames) is used as an input in combination with a captured high-resolution image (e.g., captured by a high-resolution image sensor) to generate depth information for a captured environment. In this regard, composite images may be used in combination with non-composite images (e.g., captured high-resolution images) to generate depth information for a captured environment.

Furthermore, the foregoing examples have focused, at least in part, on implementations in which each composite image is generated from image frames (or a video stream) captured by a single image capture device. In some instances, a composite image may be generated using image frame inputs captured by multiple different image sensors.

Figure 6B:
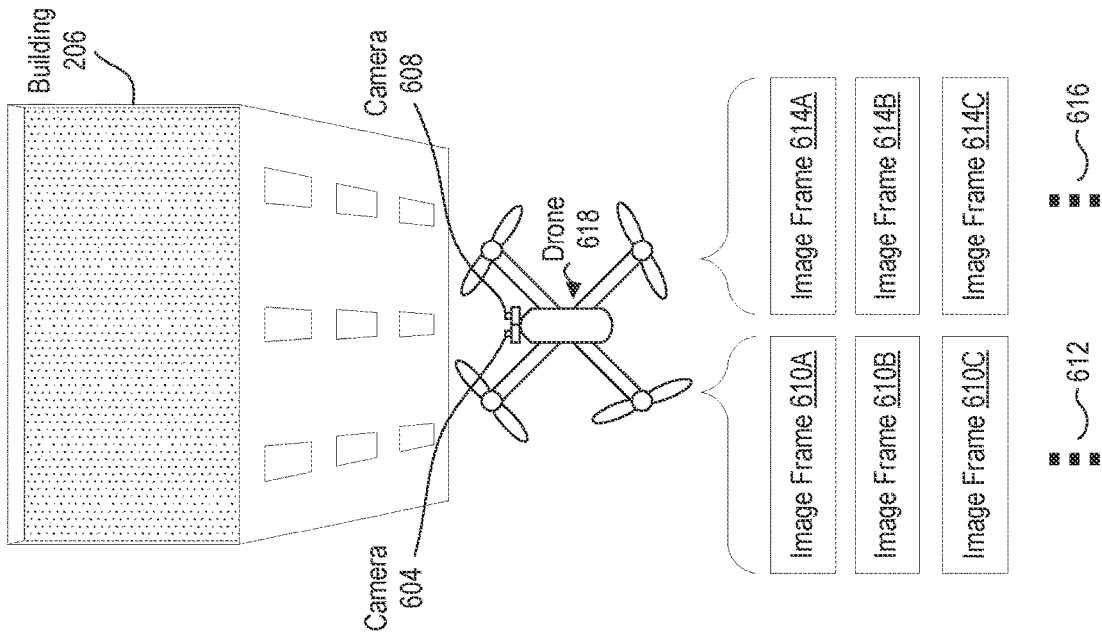
FIGS. 6A and 6B illustrate examples of capturing low-resolution images using image sensors within close proximity to one another.
Figure 6A:
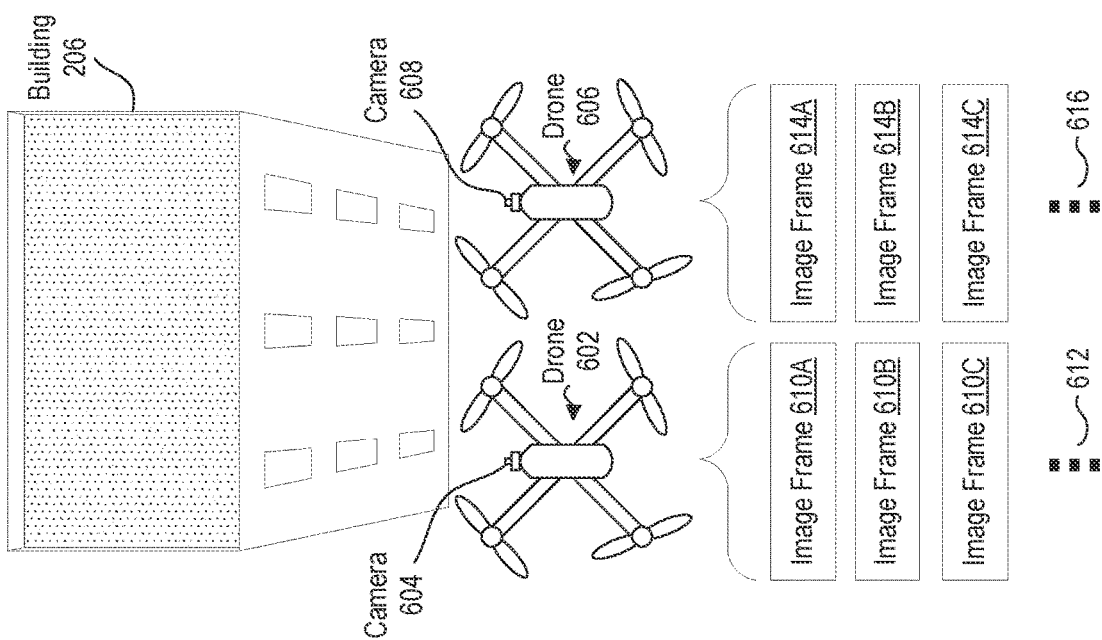

For example, FIGS. 6A and 6B illustrate low-resolution images being captured using image sensors within close proximity to one another. In particular, FIG. 6A illustrates drone 602 and drone 606, which include, respectively, camera 604 and camera 608. Camera 604 captures image frames 610A, 610B, and 610C (and/or others, as indicated by ellipsis 612), and camera 608 captures image frames 614A, 614B, and 614C (and/or others, as indicated by ellipsis 616). FIG. 6B illustrates an alternative implementation, in which the cameras 604 and 608 are implemented on a single drone 618 for capturing the image frames 610A-610C and the image frames 614A-614C.

Similar to the image frames 210A-210C discussed above with reference to FIGS. 2A-2C, the image frames 610A-610C captured by camera 604 may be captured from sufficiently similar poses so as to be groupable for forming a composite image. Similarly, the image frames 614A-614C captured by camera 608 may be captured from sufficiently similar poses so as to be groupable for forming a composite image. In addition, the separate image frames captured by the separate cameras 604 and 608 may capture image frames that depict the building 206 from substantially similar perspectives so as to render them groupable for forming composite images.

For example, image frame 610A and image frame 614A may capture the building 206 from substantially similar poses (except from the relatively small spatial offset between them). Similarly, image frames 610B and 614B may capture the building 206 from substantially similar perspectives, image frames 610C and 614C may capture the building 206 from substantially similar perspectives, and so forth. In some implementations, the image capture timing of the cameras 604 and 608 is synchronized (e.g., wherein image frames 610A and 614A are captured at a same timepoint, image frames 610E3 and 614E3 are captured at a same subsequent timepoint, and so forth).

In this regard, the low-resolution image frames 610A-610C and 614A-614C captured by the separate cameras 604 and 608 may be used within the same group of image frames to form a composite image.

Figure 7:
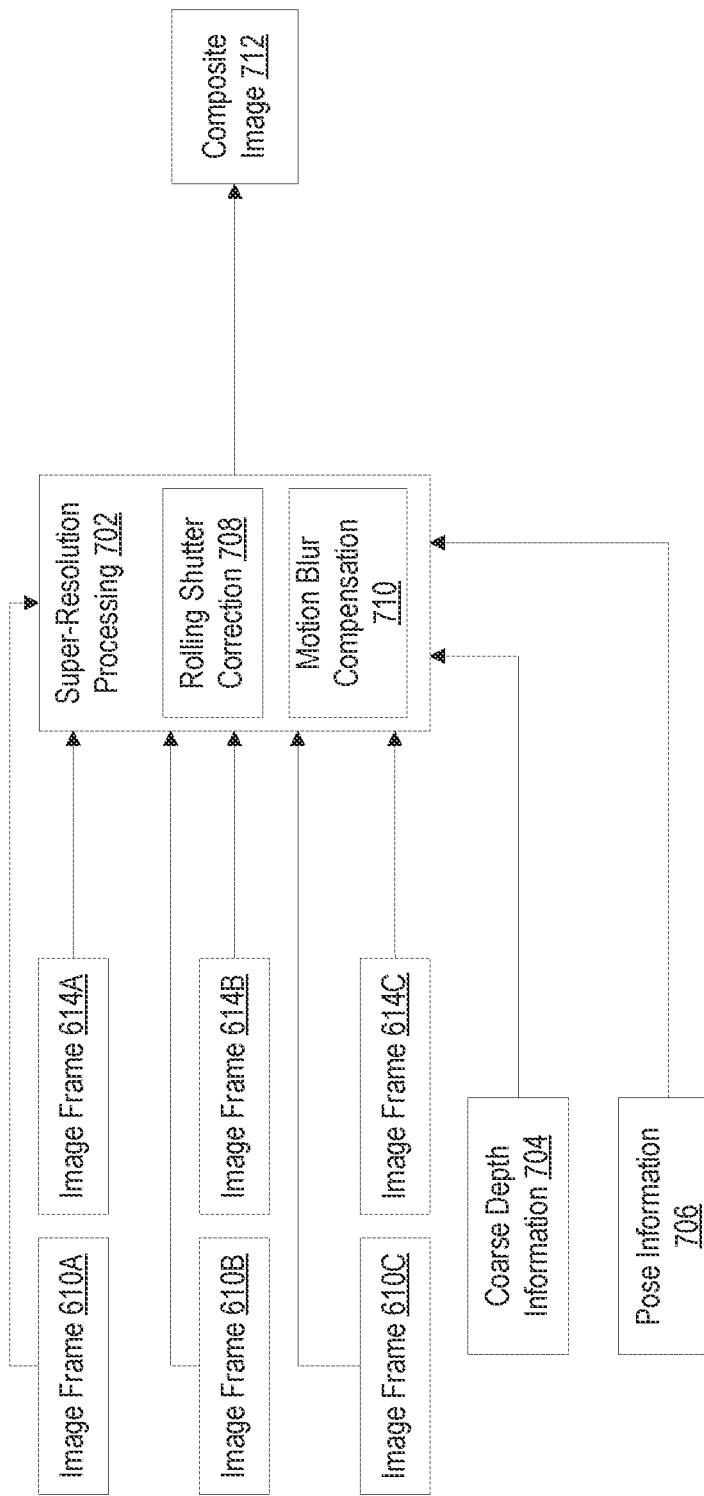
FIG. 7 illustrates an example of generating a composite image using low-resolution images captured by image sensors within close proximity to one another during image capture.

In this regard, the low-resolution image frames 610A-610C and 614A-614C captured by the separate cameras 604 and 608 may be used within the same group of image frames to form a composite image. FIG. 7 illustrates an example of generating a composite image using low-resolution images captured by separate image sensors within close proximity to one another during image capture. In particular, FIG. 7 illustrates image frames 610A-610C (captured by camera 604) and image frames 614A-614C (captured by the camera 608) grouped together in a single group of image frames to be used as input to super-resolution processing 702 to generate a composite image 712.

In some instances, utilizing additional image frame input captured from one or more additional cameras (with sufficiently similar poses at the time(s) of capture) may improve the quality of the composite image 712 generated via super-resolution processing 702.

FIG. 7 also illustrates additional inputs and/or components associated with super-resolution processing 702 that may influence the quality of composite images (e.g., composite image 712) generated thereby. For example, FIG. 7 illustrates coarse depth information 704 that may be used as an input to super-resolution processing 702 for generating the composite image 712. Coarse depth information 704 may be generated by performing sparse depth processing on two or more of the image frames 610A-610C and/or 614A-614C within the group of image frames used to generate the composite image 712. For instance, feature extraction may be performed on two or more of the image frames, and stereo matching may be performed on the identified features to generate sparse or coarse depth information 704 that can be used to further guide the super-resolution processing 702 to generate the composite image 712. In some instances, feature matching information may additionally or alternatively be used as an input to the super-resolution processing 702.

FIG. 7 also illustrates pose information 706 that may be used as an input to super-resolution processing 702. The pose information 706 may comprise the pose values associated with one or more of the various low-resolution image frames 610A-610C and 614A-614C used as input to super-resolution processing 702 to generate the composite image 712. The pose values may provide an indication of the relative perspectives from which the various image frames were captured and thereby improve the super-resolution processing 702 to generate the composite image 712.

FIG. 7 furthermore illustrates that super-resolution processing 702 may be associated with additional algorithms for improving the composite image 712 output from the super-resolution processing 702. For instance, FIG. 7 depicts the super-resolution processing in association with rolling shutter correction 708 and motion blur compensation 710. Where the image frames 610A-610C and/or 614A-614C are captured using rolling shutter cameras, rolling shutter correction 708 may comprise performing per-scanline corrections to the image frame input based on per-scanline pose values recorded during rolling shutter capture of the image frames. Such corrections may be performed on the image frames prior to providing them as input to super-resolution processing 702 or may be performed as part of the super-resolution processing 702 itself. Motion blur compensation 710 may comprise any pose-based, computer-vision-based, or other type of motion blur compensation processing known in the art. Additional or alternative inputs and/or algorithms may be applied to influence the quality of the composite image 712 generated via super-resolution processing 702.

One will appreciate, in view of the present disclosure, that the types of inputs and/or algorithms for super-resolution processing 702 discussed with reference to FIG. 7 may be used in the various configurations for generating composite images, depth information, and/or other output based on low-resolution images (e.g., such as where the image frame input is captured by a single camera, or in other situations described herein or contemplated hereby).

Figure 8:
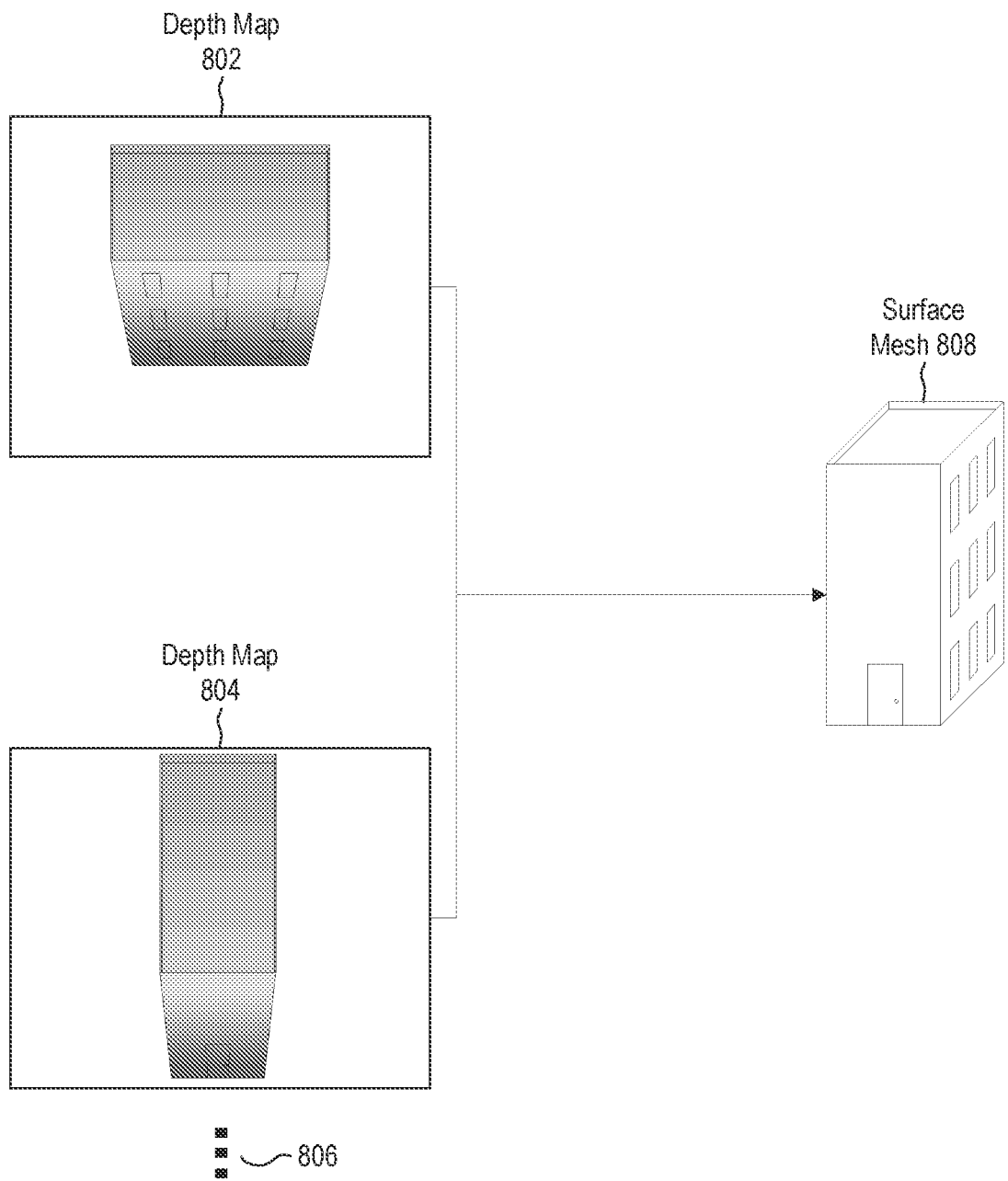
FIG. 8 illustrates an example of generating a surface mesh using depth information generated from low-resolution images.

FIG. 8 illustrates a depth map 802, which is generated based on one or more composite images as described herein (e.g., similar to depth map 310 of FIG. 3C, or depth map 510 of FIG. 5). The depth map 802 includes depth values representative of the building 206 shown previously. FIG. 8 also includes a depth map 804 representative of the building 206 from a different capture perspective than the depth map 802. FIG. 8 illustrates that depth information from multiple depth maps (or a single depth map) may be used to generate a surface mesh 808. The surface mesh 808 may describe the objects represented in the depth map(s) 802 and/or 804 three-dimensionally and may therefore be used for various applications that utilize 3D models (e.g., MR experiences). Depth maps may be combined utilizing various techniques, such as feature alignment/stitching. The ellipsis 806 indicates that other depth maps capturing the building 206 from additional perspectives may be used to form the surface mesh 808.

Figure 9:
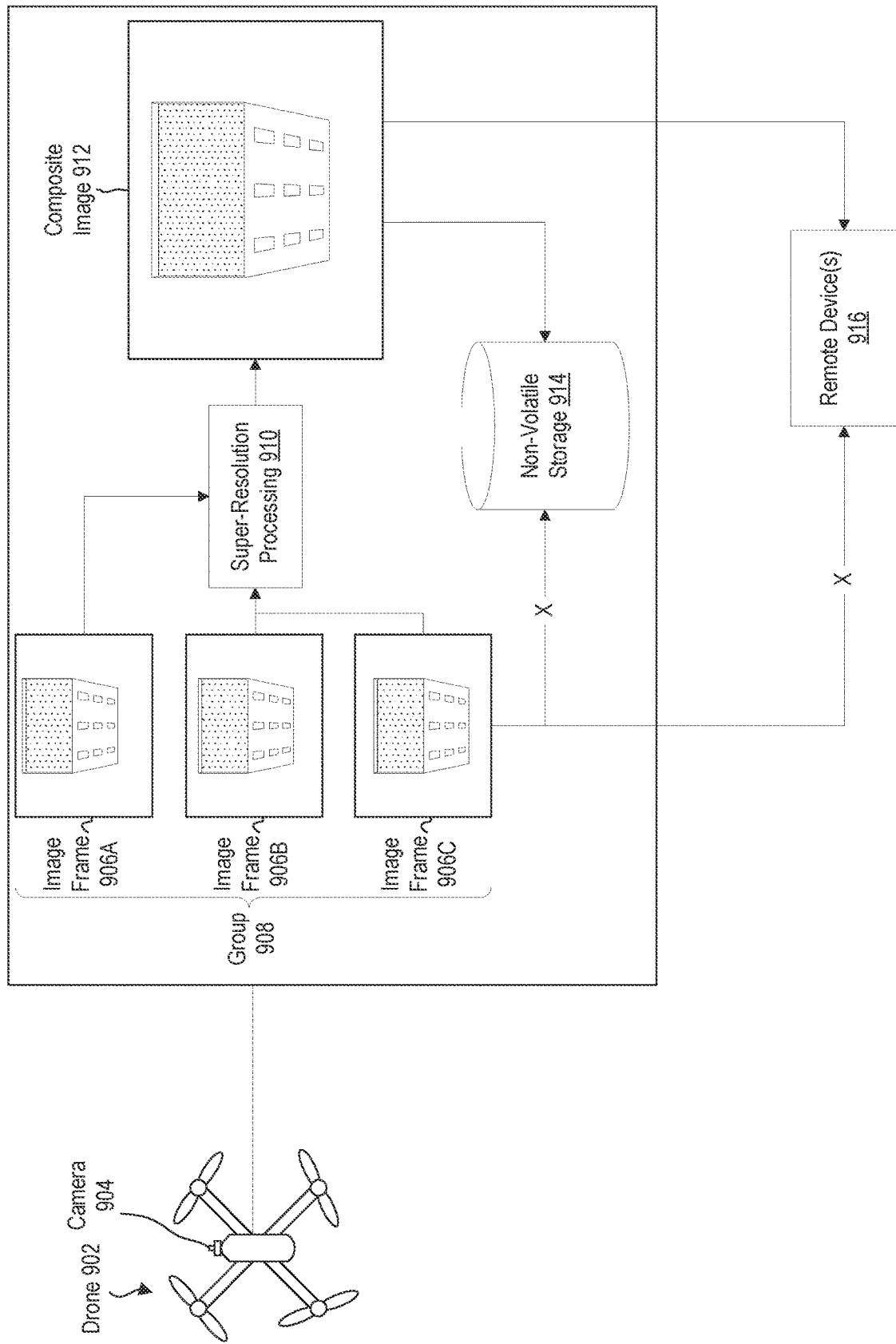
FIG. 9 illustrates an example of capturing low-resolution images using an image capture device attached to an aerial vehicle and transmitting or storing high-resolution images generated based on the low-resolution images.

As indicated hereinabove, utilizing low-resolution images to generate composite images may reduce computer storage burden and/or bandwidth requirements associated with capturing useful aerial images of an environment. By way of example, FIG. 9 illustrates a system comprising drone 902 and camera 904. Similar to other examples described herein, the camera 904 captures low-resolution image frames 906A, 906B, and 906C, which are organized into a group 908 and provided as input to super-resolution processing 910 to form a composite image 912. As illustrated in FIG. 9, the system may store the composite image 912 in non-volatile storage 914 such that the composite image 912 remains accessible after the system has lost power. FIG. 9 also illustrates the system transmitting the composite image 912 to remote device(s) 916.

FIG. 9 furthermore illustrates that the system may refrain from storing the image frames 906A-906C in non-volatile storage 914 and may refrain from transmitting the image frames 906A-906C to remote device(s) 916 (as indicated in FIG. 9 by the "X" symbols on the arrows extending from the image frames 906A-906C to the non-volatile storage 914 and the remote device(s) 916). The image frames 906A-906C may instead be maintained in volatile storage until they have been provided as input to super-resolution processing 910 to generate the composite image 912, after which the system may overwrite or delete the image frames 906A-906C. In many instances, a composite image 912 may comprise a smaller file size than the combined size of the image frames 906A-906C that form the group 908 of image frames used to form the composite image. In this way, storing the composite image 912 while refraining from storing the group 908 of image frames in a non-volatile manner may allow the system to store image data capturing a greater portion of an environment. Similarly, refraining from transmitting the group 908 of image frames to remote device(s) 916 may allow for reduced bandwidth for transmitting image data capturing an environment.

Although at least some of the foregoing examples have referred to aerial or other vehicles "traveling" within an environment during capture of low-resolution image frames, one will appreciate, in view of the present disclosure, that low-resolution image frames may be captured from a substantially static position in an environment, or during consecutive actions of maintaining a position within an environment and traveling/reorienting within an environment.

Example Method(s) for Generating Depth Information from Low-Resolution Images

The following discussion now refers to a number of methods and method acts that may be performed by the disclosed systems. Although the method acts are discussed in a certain order and illustrated in a flow chart as occurring in a particular order, no particular ordering is required unless specifically stated, or required because an act is dependent on another act being completed prior to the act being performed. One will appreciate that certain embodiments of the present disclosure may omit one or more of the acts described herein.

Figure 10:
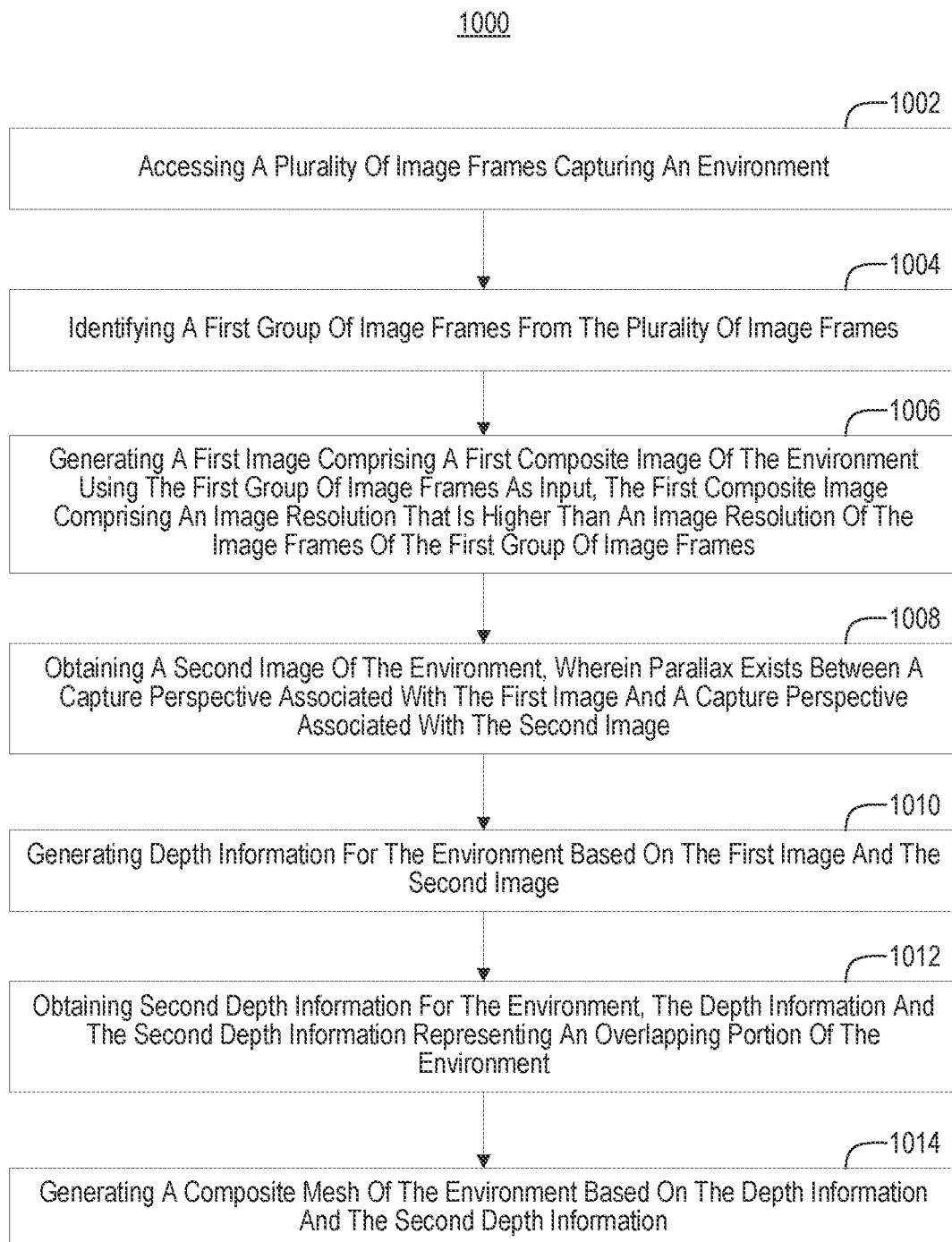
FIGS. 10 and 11 illustrate example flow diagrams depicting acts associated with generating depth information from low-resolution images.
Figure 11:
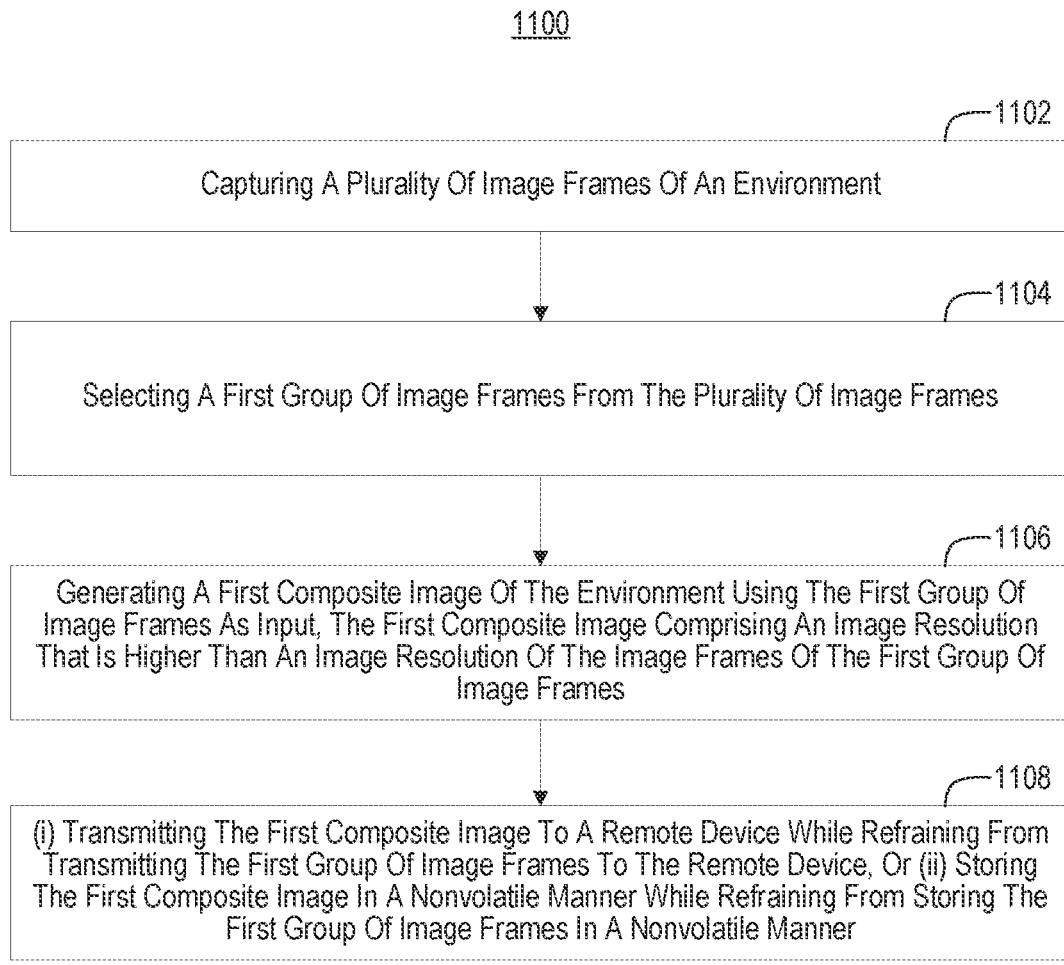

FIGS. 10 and 11 illustrate example flow diagrams 1000 and 1100, respectively, depicting acts associated with generating depth information from low-resolution images. The discussion of the various acts represented in the flow diagrams include references to various hardware components described in more detail with reference to FIG. 1.

Act 1002 of flow diagram 1000 includes accessing a plurality of image frames capturing an environment. Act 1002 is performed, in some instances, by a system 100 utilizing processor(s) 102, storage 104, sensor(s) 110, input/output system(s) 112, communication system(s) 114, and/or other components. In some instances, the system comprises a vehicle (e.g., an aerial vehicle, or other type of vehicle) that includes an image capture device that captures the plurality of image frames while traveling within the environment.

Act 1004 of flow diagram 1000 includes identifying a first group of image frames from the plurality of image frames. Act 1004 is performed, in some instances, by a system 100 utilizing processor(s) 102, storage 104, sensor(s) 110, input/output system(s) 112, communication system(s) 114, and/or other components. In some instances, the image frames of the first group of image frames are consecutively captured image frames. In some implementations, the image frames of the first group of image frames are identified based on pose associated with the image frames of the first group of image frames.

Act 1006 of flow diagram 1000 includes generating a first image comprising a first composite image of the environment using the first group of image frames as input, the first composite image comprising an image resolution that is higher than an image resolution of the image frames of the first group of image frames. Act 1006 is performed, in some instances, by a system 100 utilizing processor(s) 102, storage 104, sensor(s) 110, input/output system(s) 112, communication system(s) 114, and/or other components. In some implementations, generating the first image includes using pose values associated with the first group of image frames as input. In some instances, generating the first image includes using an additional image frame as input, such as an additional frame captured by a second image capture device that is untethered from a first image capture device that captures the first group of image frames.

Furthermore, in some implementations, generating the first image includes using input based on coarse depth information determined from the first group of image frames. Still furthermore, in some instances, generating the first image includes rolling shutter correction processing and/or motion blur compensation processing.

Act 1008 of flow diagram 1000 includes obtaining a second image of the environment, wherein parallax exists between a capture perspective associated with the first image and a capture perspective associated with the second image. Act 1008 is performed, in some instances, by a system 100 utilizing processor(s) 102, storage 104, sensor(s) 110, input/output system(s) 112, communication system(s) 114, and/or other components. In some implementations, the second image comprises a second composite image of the environment. The second composite image may be generated based on a second group of image frames capturing the environment, and the second composite image may include an image resolution that is higher than an image resolution of the image frames of the second group of image frames.

In some instances, the second group of image frames is captured by a second image capture device that is untethered from a first image capture device that captures the first group of image frames. In some instances, the second group of images is captured by a same image capture device that captures the first group of image frames. Furthermore, in some instances, the second group of images is captured temporally subsequent to the first group of images.

Act 1010 of flow diagram 1000 includes generating depth information for the environment based on the first image and the second image. Act 1010 is performed, in some instances, by a system 100 utilizing processor(s) 102, storage 104, sensor(s) 110, input/output system(s) 112, communication system(s) 114, and/or other components. The depth information may take on various forms, such as a depth map or a disparity map. The depth information may enable various applications, such as generating a surface reconstruction mesh of the captured environment.

Act 1012 of flow diagram 1000 includes obtaining second depth information for the environment, the depth information and the second depth information representing an overlapping portion of the environment. Act 1012 is performed, in some instances, by a system 100 utilizing processor(s) 102, storage 104, sensor(s) 110, input/output system(s) 112, communication system(s) 114, and/or other components. In some implementations, the second depth information is obtained based on groups of image frames captured by a same image capture device that captures the first group of image frames.

Act 1014 of flow diagram 1000 includes generating a composite mesh of the environment based on the depth information and the second depth information. Act 1014 is performed, in some instances, by a system 100 utilizing processor(s) 102, storage 104, sensor(s) 110, input/output system(s) 112, communication system(s) 114, and/or other components. A composite mesh of the environment may comprise a 3D representation of the environment.

Referring now to FIG. 11, act 1102 of flow diagram 1100 includes capturing a plurality of image frames of an environment. Act 1102 is performed, in some instances, by a system 100 utilizing processor(s) 102, storage 104, sensor(s) 110, input/output system(s) 112, communication system(s) 114, and/or other components. In some implementations, the image capture device is connected to a vehicle (e.g., an aerial vehicle or other type of vehicle) traveling within the environment during capture of the plurality of image frames.

Act 1104 of flow diagram 1100 includes selecting a first group of image frames from the plurality of image frames. Act 1104 is performed, in some instances, by a system 100 utilizing processor(s) 102, storage 104, sensor(s) 110, input/output system(s) 112, communication system(s) 114, and/or other components. In some implementations, the image frames of the first group of image frames are consecutively captured image frames. In some instances, the image frames of the first group of image frames are identified based on pose associated with the image frames of the first group of image frames.

Act 1106 of flow diagram 1100 includes generating a first composite image of the environment using the first group of image frames as input, the first composite image comprising an image resolution that is higher than an image resolution of the image frames of the first group of image frames. Act 1106 is performed, in some instances, by a system 100 utilizing processor(s) 102, storage 104, sensor(s) 110, input/output system(s) 112, communication system(s) 114, and/or other components. In some implementations, generating the first composite image includes using pose values associated with the first group of image frames as input. In some instances, generating the first composite image includes using an additional image frame as input, wherein the additional image frame is captured by a second image capture device that is untethered from the image capture device. Furthermore, in some implementations, generating the first composite image includes using input based on coarse depth information determined from the first group of image frames. Still furthermore, in some instances, generating the first composite image includes rolling shutter correction processing. Additionally, or alternatively, generating the first composite image includes motion blur compensation processing.

Act 1108 of flow diagram 1100 includes (i) transmitting the first composite image to a remote device while refraining from transmitting the first group of image frames to the remote device, or (ii) storing the first composite image in a nonvolatile manner while refraining from storing the first group of image frames in a nonvolatile manner. Act 1108 is performed, in some instances, by a system 100 utilizing processor(s) 102, storage 104, sensor(s) 110, input/output system(s) 112, communication system(s) 114, and/or other components. In some implementations, act 1108 includes transmitting the first composite image to the remote device while refraining from transmitting the first group of image frames to the remote device. In some implementations, act 1108 includes storing the first composite image in a nonvolatile manner while refraining from storing the first group of image frames in a nonvolatile manner.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A system for generating depth information from low-resolution images of a captured environment, the system comprising:
    one or more processors; and
    one or more hardware storage devices storing instructions that are executable by the one or more processors to configure the system to generate depth information from low-resolution images of a captured environment by configuring the system to:
        access a plurality of image frames capturing an environment and acquired by one or more image capture devices;
        identify a first group of image frames from the plurality of image frames;
        generate a first image comprising a first composite image of the environment using the first group of image frames as input and using super-resolution imaging techniques, the first composite image comprising an image resolution that is higher than an image resolution of the image frames of the first group of image frames;
        obtain a second image of the environment, wherein parallax exists between a capture perspective associated with the first composite image and a capture perspective associated with the second image, wherein the second image comprises an image resolution that is higher than the image resolution of the image frames of the first group of image frames; and
        generate depth information for the environment based on the first composite image and the second image.

2. The system of claim 1, wherein the system comprises a vehicle, and wherein the vehicle comprises an image capture device that captures the plurality of image frames while traveling within the environment.

3. The system of claim 1, wherein the image frames of the first group of image frames are consecutively captured image frames.

4. The system of claim 1, wherein the image frames of the first group of image frames are identified based on pose associated with the image frames of the first group of image frames.

5. The system of claim 1, wherein the second image comprises a second composite image of the environment, the second composite image being generated based on a second group of image frames capturing the environment, the second composite image comprising an image resolution that is higher than an image resolution of the image frames of the second group of image frames.

6. The system of claim 5, wherein the second group of image frames is captured by a second image capture device that is untethered from a first image capture device that captures the first group of image frames.

7. The system of claim 5, wherein the second group of image frames is captured by a same image capture device that captures the first group of image frames.

8. The system of claim 7, wherein the second group of image frames is captured temporally subsequent to the first group of image frames.

9. The system of claim 1, wherein generating the first image includes using pose values associated with the first group of image frames as input.

10. The system of claim 1, wherein generating the first image includes using an additional image frame as input, wherein the additional image frame is captured by a second image capture device that is untethered from a first image capture device that captures the first group of image frames.

11. The system of claim 1, wherein generating the first image includes using input based on coarse depth information determined from the first group of image frames.

12. The system of claim 1, wherein generating the first image includes rolling shutter correction processing.

13. The system of claim 1, wherein generating the first image includes motion blur compensation processing.

14. The system of claim 1, wherein the instructions are executable by the one or more processors to further configure the system to:
    obtain second depth information for the environment, the depth information and the second depth information representing an overlapping portion of the environment; and
    generate a composite mesh of the environment based on the depth information and the second depth information.

15. The system of claim 14, wherein the second depth information is obtained based on groups of image frames captured by a same image capture device that captures the first group of image frames.

16. An image capture device, comprising:
an image sensor;
one or more processors; and
one or more hardware storage devices storing instructions that are executable by the one or more processors to configure the image capture device to capture images of an environment to facilitate generation of depth information for the environment by configuring the image capture device to:
capture a plurality of image frames of an environment using the image sensor;
select a first group of image frames from the plurality of image frames;
generate a first composite image of the environment using the first group of image frames as input and using super-resolution imaging techniques, the first composite image comprising an image resolution that is higher than an image resolution of the image frames of the first group of image frames, wherein generating the first composite image includes using an additional image frame as input, wherein the additional image frame is captured by a second image capture device that is untethered from the image capture device; and
(i) transmit the first composite image to a remote device while refraining from transmitting the first group of image frames to the remote device, or (ii) store the first composite image in a nonvolatile manner while refraining from storing the first group of image frames in a nonvolatile manner.

17. The image capture device of claim 16, wherein the image capture device is connected to a vehicle traveling within the environment during capture of the plurality of image frames.

18. The image capture device of claim 16, wherein the image frames of the first group of image frames are consecutively captured image frames.

19. The image capture device of claim 16, wherein the image frames of the first group of image frames are identified based on pose associated with the image frames of the first group of image frames.

20. The image capture device of claim 16, wherein generating the first composite image includes using pose values associated with the first group of image frames as input.

* * * * *